United States Patent [19]

Taniguchi et al.

[11] Patent Number: 5,274,719
[45] Date of Patent: Dec. 28, 1993

[54] IMAGE DATA CODING APPARATUS

[75] Inventors: Hayashi Taniguchi, Komae; Noboru Murayama, Machida; Koichi Suzuki, Yokohama, all of Japan

[73] Assignee: Ricoh Company, Ltd., Tokyo, Japan

[21] Appl. No.: 889,884

[22] Filed: May 29, 1992

[30] Foreign Application Priority Data

May 31, 1991 [JP] Japan ................. 3-129254

[51] Int. Cl.$^5$ .................. G06K 9/36; H04N 1/419
[52] U.S. Cl. ........................ 382/56; 382/22; 358/261.1; 358/261.2
[58] Field of Search .................. 382/56, 22, 55; 358/261.1, 261.2, 261.3

[56] References Cited

U.S. PATENT DOCUMENTS 3,987,412 10/1976 Morrin, II ................. 382/55
4,631,521 12/1986 El-Sherbini ................ 358/261.1

Primary Examiner—Joseph Mancuso
Assistant Examiner—Jon C. Chang
Attorney, Agent, or Firm—Mason, Fenwick & Lawrence

[57] ABSTRACT

An image data coding apparatus includes a coder for coding input binary data in a predetermined coding algorithm and for outputting coded data, a conversion circuit for repeatedly performing a converting operation with respect to binary image data supplied from an external unit, a determination circuit for determining a number of times which the converting operation should be repeated in the conversion circuit based on a condition in which, when data obtained by repeating the converting operation the number of times in the conversion circuit is coded by the coder, a number of codes representing coded data output from the coder is minimum; and a circuit, for supplying to the coder, as the input data, converted data obtained by repeating the conversion operation the number of times determined by the determination circuit. The image coding apparatus outputs the coded data and data representing the number of times the converting operation is repeated.

8 Claims, 7 Drawing Sheets (a) ORIGINAL IMAGE ⟺ (b) DIFFERENTIAL PATTARN

FIG. 3

Org ≡ 10110

| | 2 BITS |
|---|---|
| Org | 1 0 |
| Op① | 1 1 |
| Op2 | 1 0 |

FIG. 4B

| | 3 BITS |
|---|---|
| Org | 1 0 1 |
| Op① | 1 1 1 |
| Op2 | 1 0 0 |
| Op3 | 1 1 0 |
| Op4 | 1 0 1 |

FIG. 4C

| | 4 BITS |
|---|---|
| Org | 1 0 1 1 |
| Op① | 1 1 1 0 |
| Op2 | 1 0 0 1 |
| Op3 | 1 1 0 1 |
| Op4 | 1 0 1 1 |

FIG. 4D

| | 5 BITS |
|---|---|
| Org | 1 0 1 1 0 |
| Op1 | 1 1 1 0 1 |
| Op2 | 1 0 0 1 1 |
| Op3 | 1 1 0 1 0 |
| Op4 | 1 0 1 1 1 |
| Op⑤ | 1 1 1 0 0 |
| Op6 | 1 0 0 1 0 |
| Op7 | 1 1 0 1 1 |
| Op8 | 1 0 1 1 0 |

FIG. 4E

| | 6 BITS |
|---|---|
| Org | 1 0 1 1 0 0 |
| Op 1 | 1 1 1 0 1 0 |
| Op ② | 1 0 0 1 1 1 |
| Op 3 | 1 1 0 1 0 0 |
| Op 4 | 1 0 1 1 1 0 |
| Op 5 | 1 1 1 0 0 1 |
| Op 6 | 1 0 0 1 0 1 |
| Op 7 | 1 1 0 1 1 1 |
| Op 8 | 1 0 1 1 0 0 |

FIG. 4F

| | 8 BITS |
|---|---|
| Org | 1 0 1 1 0 0 1 1 |
| Op 1 | 1 1 1 0 1 0 1 0 |
| Op ② | 1 0 0 1 1 1 1 1 |
| Op 3 | 1 1 0 1 0 0 0 0 |
| Op 4 | 1 0 1 1 1 0 0 0 |
| Op 5 | 1 1 1 0 0 1 0 0 |
| Op 6 | 1 0 0 1 0 1 1 0 |
| Op 7 | 1 1 0 1 1 1 0 1 |
| Op 8 | 1 0 1 1 0 0 1 1 |

|  |  | TOTAL NUMBER OF B-RUN & W-RUN | NUMBER OF BLACK DOTS |
|---|---|---|---|
| Org | 0 1 0 0 0 1 0 0 0 1 1 0 0 1 1 0 | 9 | 6 |
| Op 1 | 0 1 1 0 0 1 1 0 0 1 0 1 0 1 0 1 | 1 2 | 8 |
| Op 2 | 0 1 0 1 0 1 0 1 0 1 1 1 1 1 1 1 | 1 0 | 1 1 |
| Op 3 | 0 1 1 1 1 1 1 1 1 1 0 0 0 0 0 0 | 3 | 9 |
| Op 4 | 0 1 0 0 0 0 0 0 0 0 1 0 0 0 0 0 | 5 | 2 |
| Op 5 | 0 1 1 0 0 0 0 0 0 0 1 1 0 0 0 0 | 5 | 4 |
| Op 6 | 0 1 0 1 0 0 0 0 0 0 1 0 1 0 0 0 | 9 | 4 |
| Op 7 | 0 1 1 1 1 0 0 0 0 0 1 1 1 1 0 0 | 5 | 8 |

SCANNING LINE

|     |                                    | TOTAL NUMBER OF B-RUN & W-RUN | NUMBER OF BLACK DOTS |
|-----|------------------------------------|---|----|
| Org | 0 1 1 0 0 0 1 0 0 0 1 0 0 0 1 0 0 0 1 0 0 0 1 1 0 | 1 3 | 8 |
| Op1 | 0 1 0 1 0 0 1 1 0 0 1 1 0 0 0 1 1 0 0 1 1 0 0 1 0 1 | 1 6 | 1 2 |
| Op2 | 0 1 1 1 1 0 1 0 1 0 1 0 1 0 0 1 0 1 0 1 0 1 0 1 1 1 | 2 0 | 1 5 |
| Op3 | 0 1 0 0 0 1 1 1 1 1 1 1 1 1 0 1 1 1 1 1 1 1 1 1 0 0 | 7 | 1 9 |
| Op4 | 0 1 1 0 0 1 0 0 0 0 0 0 0 1 1 0 0 0 0 0 0 0 0 0 1 0 | 9 | 6 |
| Op5 | 0 1 0 1 0 1 1 0 0 0 0 0 0 0 1 0 1 0 0 0 0 0 0 0 1 1 | 1 2 | 8 |
| Op6 | 0 1 1 1 1 1 0 1 0 0 0 0 0 0 1 1 1 1 0 0 0 0 0 0 1 0 | 9 | 1 1 |
| Op7 | 0 1 0 0 0 0 1 1 1 0 0 0 0 0 1 0 0 0 1 0 0 0 0 0 1 1 | 1 0 | 8 |
| Op8 | 0 1 1 0 0 0 1 0 0 1 0 0 0 0 1 1 0 0 1 1 0 0 0 0 1 0 | 1 3 | 9 |

IMAGE DATA CODING APPARATUS

BACKGROUND OF THE INVENTION (1) Field of the Invention

The present invention generally relates to an image data coding apparatus, and more particularly to an image data coding apparatus in which binary images, such as character images and halftone dot images, are coded. The present invention can be applied to facsimile machines and image filing systems.

(2) Description of related art

Conventionally, binary images, such as character and line images, are generally coded in accordance with an MH (modified Huffman) coding scheme, an MR (modified READ) coding scheme or the like. However, pseudo-multilevel images, such as halftone dot images and dither images, can not be coded at a high compression rate by the above coding schemes. That is, as the MH and MR coding schemes are suitable for coding images having white dots or black dots continuously arranged in a row, in a case where images having dispersed black dots and white dots are coded in accordance with the MH or MR coding scheme, the coding efficiency is deteriorated.

Conventionally, a predictive coding method has been known as a coding method suitable for effectively coding pseudo-multilevel images. In the predictive coding method, some dots strongly correlated with an objective dot are selected from scanned dots, a value of the objective dot is predicted based on the selected dots and a predicted value of the objective dot is obtained. Then, a difference between the predicted value and an actual value of the objective dot is coded. In addition, a predictive component coding method can be also applied to the pseudo-multilevel images, the coding method being obtained, from a viewpoint of an information theory, by introducing a concept from a source component coding method into the predictive coding method.

However, in the predictive coding method, it is necessary to use a predictive table corresponding to an image to be coded. Thus, a scope of images which can be coded in accordance with the predictive coding method is limited. Further, coding efficiency is not satisfactory.

SUMMARY OF THE INVENTION

Accordingly, a general object of the present invention is to provide a novel and useful image data coding apparatus in which the disadvantages of the aforementioned prior art are eliminated.

A more specific object of the present invention is to provide an image data coding apparatus in which both normal binary images, such as character and line images. and pseudo-multilevel images, such as halftone dot images and dither images, can be coded at a high rate of compression.

The above objects of the present invention are achieved by an image data coding apparatus comprising: coder means for coding input binary data in a predetermined coding algorithm and for outputting coded data; conversion means for repeatedly performing a converting operation a plurality of times with respect to binary image data supplied from an external unit; determination means, coupled to the conversion means, for determining a number of times which the converting operation should be repeated in the conversion means based on a condition in which, when data obtained by repeating the converting operation the number of times in the conversion means is coded by the coder means, a number of codes representing coded data output from the coder means is a minimum; and supplying means, coupled to the coder means, the conversion means and the determination means, for supplying converted data obtained by repeating the conversion operation the number of times determined by the determination means in the conversion means to the coder means as the input data, wherein the coded data and data representing the number of times which the converting operation is repeated are output from the image coding apparatus.

According to the present invention, the data can be always coded so that the number of codes of the coded data is a minimum. Thus, both normal binary images, such as character and line images, and pseudo-multilevel images, such as halftone dot images and dither images, can be coded at a high compressibility.

Additional objects, features and advantages of the present invention will become apparent from the following detailed description when read in conjunction with the accompanying drawings.

BRIEF DESCRIPTION OF THE DRAWINGS

FIG. 3 is a diagram illustrating examples of data converted in accordance with the edge converting operation and the fill converting operation.

FIGS. 4A through 4F are diagrams illustrating examples of image data converted in accordance with the edge converting operation.

DESCRIPTION OF THE PREFERRED EMBODIMENTS

A description will now be given of an embodiment of the present invention.

Figure 1:
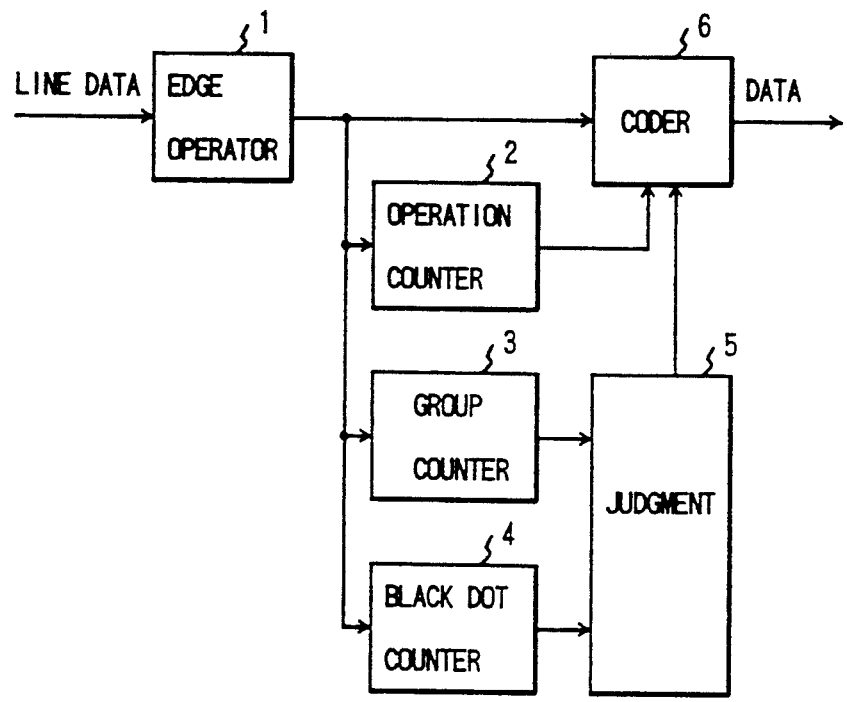
FIG. 1 is a block diagram illustrating a coding unit according to an embodiment of the present invention.

FIG. 1 shows a coder unit. Binary image data is serially supplied from an external unit (e.g. a scanner unit) to the coder unit. For example, the scanner supplies the binary image data to the coder unit line by line. The binary image data is referred to as line data. In the coder unit, an edge operator 1 applies an edge converting operation to the line data supplied from the external unit. The edge converting operation are carried out as follows. While binary image is being linearly scanned, adjacent dots are successively compared to each other. When a dot is detected at which image data changes from white to black or from black to white, a logical value "1" is given to the detected dot. A logical value "0" is given to each of other dots in the binary image. That is, by means of the edge converting operation, edges of the binary image can be detected. A bit pattern of data obtained by the edge converting operation indicates a difference between the edges of the binary image. Thus, a bit pattern of data obtained by the edge converting operation is referred to as a differential pattern.

Figure 2:
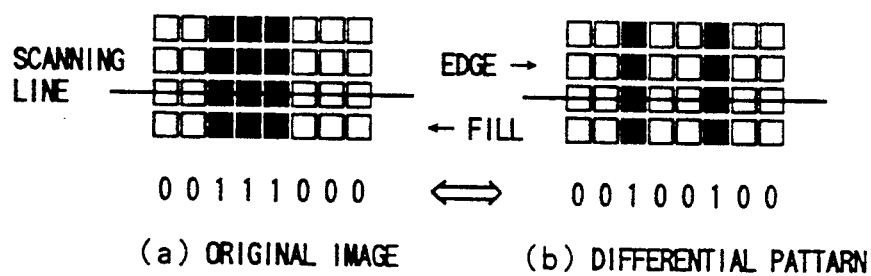
FIG. 2 is a diagram illustrating an example of image data converted in accordance with a respective edge converting operation and a fill converting operation.

For example, when line data "00111000" corresponding to a scanning line on an original binary image, shown in FIG. 2 (a), is converted in accordance with the edge converting operation, converted data having a differential pattern "00100100" shown in FIG. 2 (b) is obtained. In the line data, "1" and "0" respectively correspond to a black dot and a white dot.

An operation counter 2 counts the number of processes repeated in the edge operator 1. While the edge operator 1 repeats the edge converting operation, a differential pattern of converted data is changed as shown, for example, in FIG. 3. Referring to FIG. 3, when line data "10110" of an original image (Org) is converted in accordance with the edge converting operation, first converted data (Op1) having a differential pattern "11101" is obtained. Then, when the first converted data (Op1) is converted in accordance with the edge converting operation, second converted data (Op2) having a differential pattern "10011" is obtained. When the edge converting operation is repeated seven times in the same manner as that described above, 7th converted data (Op7) having a differential pattern "11011" is obtained. Further, when the 7th converted data (Op7) is converted in accordance with the edge converting operation, converted data having the same pattern "10110" as the line data (Org) of the original image is obtained. That is, when the edge converting operation is repeated eight times with respect to 5-bit data, a bit pattern of the converted data returns to the bit pattern corresponding to the original image (Org).

In general, in a case where the number (m) of dots corresponding to the line data is in a range defined by the following inequality, $$2^{n-1} \leq m \leq 2^n,$$

when the edge conversion process with respect to the line data is repeated $2^n$ times, a bit pattern of the converted data returns to that corresponding to the original image. That is, when the edge converting operation is repeated $2^n - 1$ times, all converted data have differential patterns different from each other can be obtained.

An inversion process of the edge converting operation is defined as a fill converting operation. The fill converting operation is carried out as follows. Binary data is scanned bit by bit, when a black dot is detected, data bits between this first black dot and the next detected black dot including the data bit of the next detected black dot are changed to the opposite state (i.e. "0" to "1" or "1" to "0"). White dots between sets of first detected black dots and next detected black dots (as above) are left unchanged. When a black dot is again detected the above process is repeated until all the data to be coded is processed. That is, all dots continuously arranged from a dot corresponding to a logical value "1" to a dot immediately before the next dot corresponding to the logical value "1" are converted to white or black. For example, when the fill converting operation with respect to the line data "10110" of the original image is repeated, a bit pattern of the converted data successively varies from Op7 to Op1 shown in FIG. 3.

Since the fill converting operation is the inverse process of the edge converting operation, when coding has been carried out by using the edge converting operation, decoding may be carried out by using the fill converting operation, and vice versa. In this embodiment, the edge converting operation is used in coding and the fill converting operation is used in decoding.

Returning to FIG. 1, a group counter 3 counts the number of groups in which black or white dots are continuously arranged, in every converted data obtained by the edge operator 1. A black dot counter 4 counts the number of black dots in every converted data obtained by the edge operator 1. A judgment circuit 5 judges, based on a count value of the group counter 3 or the black dot counter 4, the number of times which the edge conversion process should be repeated to obtain the converted data which can be coded by a minimum number of codes. A judgment algorithm in the judgment circuit 5 depends on a coding algorithm in a coder 6. The coder 6 codes the converted data supplied from the edge operator 1 in accordance with, for example, a run-length coding algorithm or an arithmetic coding algorithm.

Under the run-length coding algorithm, a group in which bits having logical value "1" corresponding to the black dot are continuously arranged is defined as a black-run, and a group in which bits having logical value "0" corresponding to the white dot are continuously arranged is defined as a white-run. The number of bits in each black-run and each white-run is defined as a run-length. Data is coded based on run-lengths of black-runs and white-runs in the data in the same manner as data coded in accordance with the MH coding scheme in G3 facsimile machines. Thus, the smaller the number of white-runs and black-runs in data, the more effectively the data is coded. That is, as the number of bits in the data is constant, the larger the run-length of each of the black-runs and white-runs, the more effectively the data is coded.

Under the arithmetic coding algorithm, data formed of symbols "0" and "1" is coded based on probabilities of occurrence of the symbols. Coded data has a decimal value. It is generally known that the smaller the number of bits having a symbol "1" (the logical value), the more effectively data is coded.

In a case where the converted data is coded, by the coder 6, in accordance with the run length coding algorithm, the number of times which the edge converting operation is repeated is determined so that the total numbers of black-runs and white runs in the converted data is a minimum. In addition, in a case where the converted data is coded by the coder 6 in accordance with the arithmetic coding algorithm, the number of times which the edge converting operation is repeated is determined so that the number of bits having the logical value "1" corresponding to the black dot is a minimum.

In a case where the coder 6 codes the converted data supplied from the edge operator 1 in accordance with the run-length coding algorithm, the number of times which the edge converting operation is repeated is determined as shown in FIGS. 4A through 4F.

FIG. 4A shows the converted data to be output from the edge operator 1 in a case where line data of an original image is represented by 2 bits "10". In this case, there is only one black-run in the first converted data Op1, and there are a black-run and a white-run in the second converted data Op2 (the original image). Thus, as shown by the circled element in FIG. 4A, it is determined that only one edge conversion process is to be carried out, and the first converted data Op1 is supplied to the coder 6.

FIG. 4B shows the converted data to be output from the edge operator 1 in a case where line data of an original image is represented by 3 bits "101". FIG. 4C shows the converted data to be output from the edge operator 1 in a case where line data of an original image is represented by 4 bits "1011". In the above cases, the first converted data Op1 is selected and supplied to the coder 6.

FIG. 4D shows the converted data to be output from the edge operator 1 in a case where line data of an original image is represented by 5 bits "10110". In this case, there are two black-runs and one white-run in each of the first, second, 4th and 7th converted data Op1, Op2, Op4 and Op7, there are two black-runs and two white-runs in each of the 3rd and 6th converted data Op3 and Op6, and there are one black-run and one white-run in the 5th converted data Op5. Thus, as shown by the circled element in FIG. 4D, it is determined that the edge conversion process is to be repeated five times, and the 5th converted data Op5 is supplied to the coder 6.

FIG. 4E shows the converted data to be output from the edge operator 1 in a case where line data of an original image is represented by 6 bits "101100". FIG. 4F shows the converted data to be output from the edge operator 1 in a case where line data of an original image is represented by 8 bits "10110011". In the above cases, the second second data Op2 is selected and supplied to the coder 6.

The coder 6 outputs coded data obtained in accordance with the run-length coding algorithm or the arithmetic coding algorithm. In the coder 6, number data representing the number of times which the edge converting operation has been repeated to obtain the converted data supplied to the coder 6 is added to the coded data. Data formed of the coded data and number data is, for example, transmitted to other terminals.

Figures 5A, 5B:
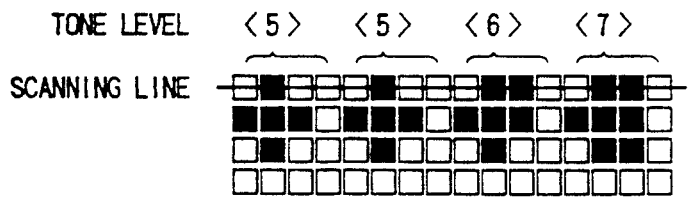
FIGS. 5A and 5B are diagrams illustrating examples of a halftone dot image converted in accordance with the edge converting operation.

FIG. 5A shows examples of dot patterns of a 16-level halftone dot image. Black dots in 4×4 matrixes respectively indicate tone levels "5", "5", "6" and "7". Line data (Org) of an original image on a scanning line shown in FIG. 5A, and converted data (Op1 through Op7) to be obtained by the edge converting operation are shown in FIG. 5B. In addition, the total number of black-runs and white runs, and the number of black dots in the line data (Org) of the original image and the number of black dots in the converted data (Op1-Op7) are also shown in FIG. 5B.

In a case where the converted data is coded in accordance with the run-length coding algorithm, when the edge operating operation is repeated three times, the total number of black-runs and white-runs can become a minimum value "3". In this case, third converted data Op3 is selected, so that the total number of black-runs and white-runs decreases from nine corresponding to the original image to three. That is, the amount of information to be coded decreases.

In a case where the converted data is coded in accordance with the arithmetic coding algorithm, when the edge converting operation is repeated four times, the number of black dots becomes the minimum value "2". In this case, 4th converted data Op4 is selected, so that the number of black dots decreases from six corresponding to the original image to two. That is, the amount of information to be coded decreases.

Figures 6A, 6B:
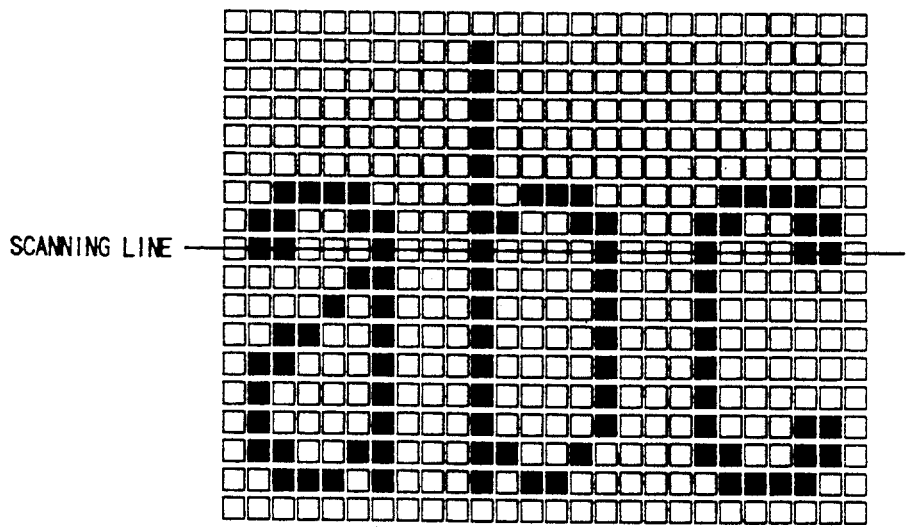
FIGS. 6A and 6B are diagrams illustrating examples of a character image converted in accordance with the edge converting operation.

FIG. 6A shows examples of dot patterns of character images "a", "b" and "c". Line data (Org) of an original image on a scanning line shown in FIG. 6A, and converted data (Op1 through Op7) to be obtained by the edge converting operation are shown in FIG. 6B. In addition, the total number of black-runs and white runs, and the number of black dots in the line data (Org) of the original image and the number of black dots in the converted data (Op1-Op7) are also shown in FIG. 6B.

In a case of the run-length coding algorithm, the third converted data Op3 is selected as data to be coded. In the case of the arithmetic coding algorithm, the 4th converted data Op4 is selected as data to be coded.

Figure 7:
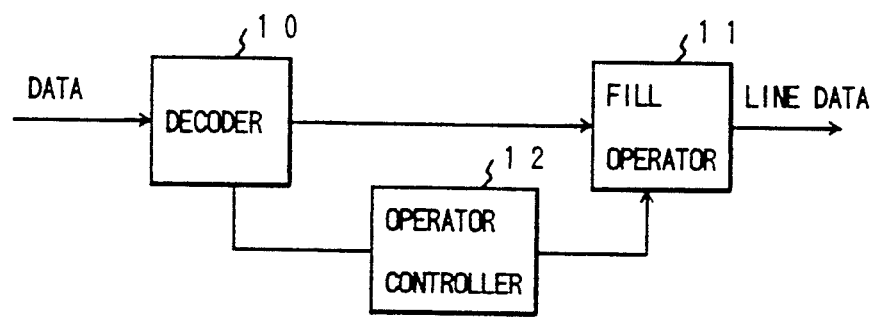
FIG. 7 is a block diagram illustrating an example of a decoding unit.

FIG. 7 shows a decoding unit for decoding coded data transmitted from a terminal having the coding unit shown in FIG. 1.

Referring to FIG. 7, data received by the decoding unit is divided into the coded data and the number data by a decoder 10. Then the decoder 10 decodes the coded data so that converted data corresponding to the coded data is obtained. The number data is supplied from the decoder 10 to an operator controller 12. A fill operator 11 repeats the fill converting operation n times, corresponding to the number data supplied from the operator controller 12, with respect to the converted data from the decoder 10. Thus, the line data of the original image is restored.

Since the edge converting operation and the fill converting operation are invertible, the fill converting operation and edge converting operation can be carried out in the coding unit and decoding unit respectively.

When the edge converting operation is repeated n times, the bit pattern of the n-th converted data is equal to that of the line data of the original image. In this case, in the decoding unit, when the edge converting operation instead of the fill converting operation is repeated (n-m) times, the converted data obtained by repeating the edge converting operation m times in the coding unit can be changed to the line data of the original image.

The present invention is not limited to the aforementioned embodiments, and variations and modifications may be made without departing from the scope of the claimed invention.

What is claimed is:

1. An image data coding apparatus comprising:
   a) coder means for coding input binary raster image data in a predetermined coding algorithm and for outputting coded data:
   b) conversion means for repeatedly performing a converting operation a plurality of times on each line of the binary raster image data, wherein the binary raster image data is supplied from an external unit;
   wherein said conversion means constitutes means for performing an edge converting operation in which:
   1) a logical value "1" is given to a dot at which image data is changed between white and black; and
   2) a logical value "0" is given to each dot at which image data is not changed between white and black;
   c) determination means, coupled to said conversion means, for determining a number of times which the converting operation should be repeated in said conversion means, based on a condition that:
   when data obtained by repeating said converting operation the number of times in said conversion means is coded by said coder means, a minimum number of codes representing coded data is output from said coder means; and d) supplying means, coupled to said coder means, said conversion means and said determination means, for supplying to said coder means, as the input data, converted obtained by repeating said converting operation the number of times determined by said determination means in said conversion means;

wherein the coded data and data representing the number of times said converting operation is repeated are output from said image coding apparatus.

2. The apparatus of claim 1, wherein:
said coding algorithm used in said coder means is a run-length coding algorithm.

3. The apparatus of claim 1, wherein:
said coding algorithm used in said coder means is an arithmetic coding algorithm.

4. The apparatus of claim 2, wherein said conversion means includes:
first means for obtaining converted data by repeating the converting operation; and
second means for determining a number of times which the converting operation should be repeated in said first means to obtain converted data in which a number of groups each having same-colored dots continuously arranged is a minimum.

5. The apparatus of claim 2, wherein:
said second means has counter means for counting the groups each having same-colored dots continuously arranged in each data obtained by said first means, said second means determining the number of times which the converting operation should be repeated based on a counting value obtained by said counter means.

6. The apparatus of claim 3, wherein said conversion means includes:
first means for obtaining converted data by repeating the converting operation; and
second means for determining a number of times which the converting operation should be repeated in said first means to obtain converted data in which a number of black dots is a minimum.

7. The apparatus of claim 4, wherein:
second means has counter means for counting black dots in each data obtained by said first means; and
said second means determines the number of times which the converting operation should be repeated, based on a counting value obtained by said counter means.

8. An image data coding apparatus comprising:
a) coder means for coding input binary raster image data in a predetermined coding algorithm and for outputting coded data;
b) conversion means for repeatedly performing a converting operation a plurality of times on each line of the binary raster image data, wherein the binary raster image data is supplied from an external unit;
wherein said conversion means constitutes means for performing a fill converting operation in which binary data is scanned bit by bit, and when a black dot is detected, data bits between:
1) a first black dot, and
2) a next detected black dot including a data bit of the next detected black dot, are changed to an opposite state;
c) determination means, coupled to said conversion means, for determining a number of times which the converting operation should be repeated in said conversion means, based on a condition that:
when data obtained by repeating said converting operation the number of times in said conversion means is coded by said coder means, a minimum number of codes representing coded data is output from said coder means; and
d) supplying means, coupled to said coder means, said conversion means and said determination means, for supplying to said coder means, as the input data, converted obtained by repeating said converting operation the number of times determined by said determination means in said conversion means;
wherein the coded data and data representing the number of times said converting operation is repeated are output from said image coding apparatus.

* * * * *